(12) United States Patent
Shin et al.

(10) Patent No.: US 11,887,617 B2
(45) Date of Patent: Jan. 30, 2024

(54) ELECTRONIC DEVICE FOR SPEECH RECOGNITION AND CONTROL METHOD THEREOF

(71) Applicant: SAMSUNG ELECTRONICS CO., LTD., Suwon-si (KR)

(72) Inventors: Ki Hoon Shin, Suwon-si (KR); Jonguk Yoo, Suwon-si (KR); Sangmoon Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/260,684

(22) PCT Filed: May 31, 2019

(86) PCT No.: PCT/KR2019/006548
§ 371 (c)(1),
(2) Date: Jan. 15, 2021

(87) PCT Pub. No.: WO2020/017759
PCT Pub. Date: Jan. 23, 2020

(65) Prior Publication Data
US 2021/0327449 A1    Oct. 21, 2021

(30) Foreign Application Priority Data

Jul. 17, 2018    (KR) ........................ 10-2018-0083144

(51) Int. Cl.
*G10L 21/0216* (2013.01)
*G10L 21/0272* (2013.01)
(Continued)

(52) U.S. Cl.
CPC ...... *G10L 21/0216* (2013.01); *G10L 21/0272* (2013.01); *G10L 25/18* (2013.01); *G10L 25/60* (2013.01); *G10L 2021/02166* (2013.01)

(58) Field of Classification Search
CPC . G10L 21/0216; G10L 21/0272; G10L 25/18; G10L 25/60
See application file for complete search history.

(56) References Cited

U.S. PATENT DOCUMENTS 6,810,116 B1 * 10/2004 Sorensen ................ H04M 1/64
7,536,029 B2    5/2009 Choi et al.
(Continued)

FOREIGN PATENT DOCUMENTS

JP    2005-338571 A    12/2005
JP    2011-103527 A    5/2011
(Continued)

OTHER PUBLICATIONS

Written Opinion of the International Searching Authority dated Sep. 19, 2019 from International Application No. PCT/KR20191/006548, 8 pages.
(Continued)

*Primary Examiner* — Richemond Dorvil
*Assistant Examiner* — Ethan Daniel Kim
(74) *Attorney, Agent, or Firm* — STAAS & HALSEY LLP

(57) ABSTRACT

An electronic device for speech recognition includes a multi-channel microphone array required for remote speech recognition. The electronic device improves efficiency and performance of speech recognition of the electronic device in a space where noise other than speech to be recognized exists. A control method includes receiving a plurality of audio signals output from a plurality of sources through a plurality of microphones and analyzing the audio signals and obtaining information on directions in which the audio signals are input and information on input times of the audio signals. A target source for speech recognition among the plurality of sources is determined on the basis of the
(Continued)

obtained information on the directions in which the plurality of audio signals are input, and the obtained information on the input times of the plurality of audio signals, and an audio signal obtained from the determined target source is processed.

9 Claims, 13 Drawing Sheets

(51) Int. Cl.
  *G10L 25/18* (2013.01)
  *G10L 25/60* (2013.01)

(56) References Cited

U.S. PATENT DOCUMENTS

| | | | |
|---|---|---|---|
| 9,159,320 | B2 | 10/2015 | Hyun et al. |
| 9,966,059 | B1* | 5/2018 | Ayrapetian ........... G10K 11/178 |
| 11,087,755 | B2 | 8/2021 | Song |
| 2010/0090834 | A1* | 4/2010 | Buchnick ............... G08B 23/00 340/573.1 |
| 2016/0372129 | A1* | 12/2016 | Nakadai ................ G10L 21/028 |
| 2017/0309292 | A1* | 10/2017 | Eddington, Jr. ... G10K 21/0224 |
| 2019/0191244 | A1* | 6/2019 | Sekiyama ................ H04R 3/04 |
| 2019/0214011 | A1 | 7/2019 | Shin et al. |
| 2019/0221210 | A1 | 7/2019 | Song |

FOREIGN PATENT DOCUMENTS

| | | |
|---|---|---|
| JP | 2012-29209 A | 2/2012 |
| KR | 10-0754385 B1 | 8/2007 |
| KR | 10-2008-0073516 A | 8/2008 |
| KR | 10-2012-0102306 | 9/2012 |
| KR | 10-2013-0101943 A | 9/2013 |
| KR | 10-1384781 B1 | 4/2014 |
| KR | 10-2018-0023702 | 3/2018 |
| KR | 10-2018-0041355 A | 4/2018 |
| KR | 10-2018-0049471 A | 5/2018 |

OTHER PUBLICATIONS

International Search Report dated Sep. 19, 2019 from International Application No. PCT/KR20191/006548, 4 pages.
Karbasi et al.: "A New DOA Estimation Method Using a Circular Microphone Array", EURASIP, 2007, pp. 778-782.
Parra et al.; "Geometric Source Separation: Merging Convolutive Source Separation With Geometric Beamforming", IEEE Transactions on Speech and Audio Processing, vol. 10, No. 6, Sep. 2002, pp. 352-362.
Valin et al.; "Enhanced Robot Audition Based on Microphone Array Source Separation with Post-Filter", 2004, 6 pages.
Talantzis et al.; "Estimation of Direction of Arrival Using Information Theory", IEE Signal Processng Letters, vol. 12, No. 8, Aug. 2005, pp. 561-564.
Shin et al.; "Blind Source Extraction based on BSS with Weak Directional Constraints using a 2-ch Small Aperture Microphone array" Samsung Best Paper Award, 2012, 5 pages.
He et al.; "Time delay estimation via non-mutual information among multiple microphones", Applied Acoustics, 74, 2013, pp. 1033-1036.
Ushakov et al.; "Speech signal enhancement for distant speech recognition in Samsung Smart TV 2015", Samsung Best Paper Award, 2015, 10 pages.
Pavlidi et al.; "Real-Time Multiple Sound Source Localization and Counting Using a Circular Microphone Array", IEEE Transactions on Audio, Speech and Language Processing, Institute of Electrical and Electronics Engineers, 2016, 21 (10), pp. 15.
Schmidt, Multiple Emitter Location and Signal Parameter Estimation, IEEE Transactions on Antennas and Propagation, vol. AP-34, No. 3, Mar. 1986, pp. 276-280.
Valin et al.: "Robust Sound Source Localization Using a Microphone Array on a mobile Robot", Proceedings of the 2003 IEEE/RSJ Intl. Conference on Intelligent Robots and Systems, Oct. 2003, pp. 1228-1233.
Nesta et al.; "Generalized State Coherence Transform for multidimensional TDOA estimation of multiple sources", Article in IEEE Transactions on Audio Speech and Language Processing, 2010, 16 pages.
Office Action dated Dec. 7, 2022 issued in Korea Application 10-2018-0083144.
Office Action dated Jun. 8, 2023 issued by the Korean Patent Application No. 10-2018-0083144 which was filed on Jul. 17, 2018.
Office Action dated Oct. 13, 2023 issued in Korean Application No. 10-2018-0083144.

* cited by examiner

Dir_buf: Queue of length Le

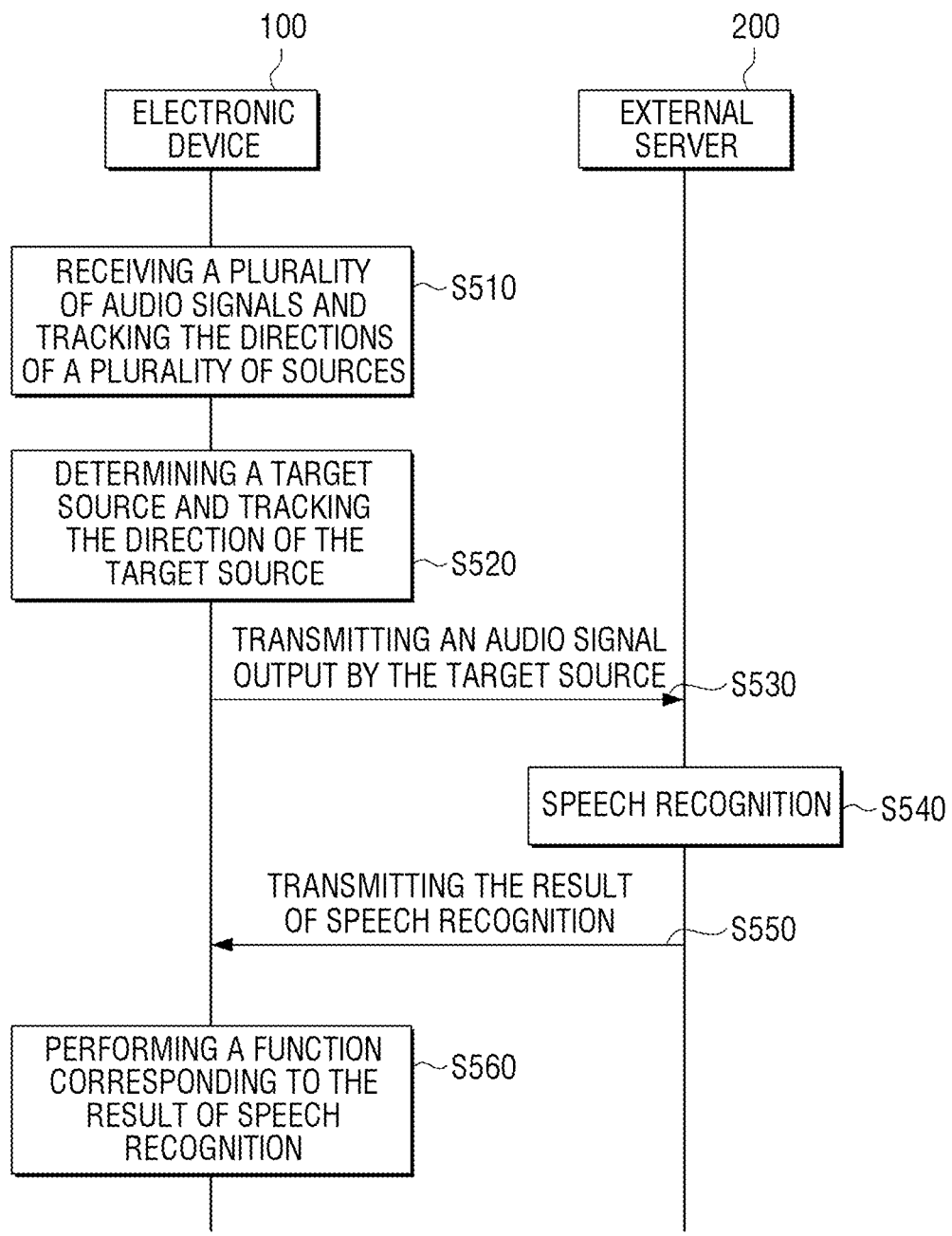

ELECTRONIC DEVICE FOR SPEECH RECOGNITION AND CONTROL METHOD THEREOF

CROSS-REFERENCE TO RELATED APPLICATIONS

This application is a U.S. National Stage Application which claims the benefit under 35 U.S.C. § 371 of International Patent Application No. PCT/KR2019/006548 filed on May 31, 2019, which claims foreign priority benefit under 35 U.S.C. § 119 of Korean Patent Application No. 10-2018-0083144 filed on Jul. 17, 2018 in the Korean Intellectual Property Office, the contents of each of which are incorporated herein by reference.

TECHNICAL FIELD

The disclosure relates to an electronic device for speech recognition including a multi-channel microphone array required for remote speech recognition, and a control method thereof. More particularly, the disclosure relates to an electronic device for improving efficiency and performance of speech recognition of an electronic device in a space where noise other than speech to be recognized exists, and a control method thereof.

DESCRIPTION OF THE RELATED ART

As use of Internet of Things increased recently, utilization for manipulation of user terminals through a speech recognition technology is being expanded.

For example, an electronic device having a microphone array consisting of a plurality of microphones and a speech recognition function may remotely control separate content reproduction devices including video and/or audio contents (e.g., a television, a disc player, a media file player, a smartphone, etc.) through recognition of a user's speech.

Here, in a preprocessing method of speech signals of an electronic device, noise is removed by separating sound sources from speech signals input into a plurality of microphones, and a speech signal in the desired direction is extracted.

In general, a mike array consisting of a plurality of mikes may determine the direction or location of a sound source, and provide beamforming for noise reduction and/or echo-position.

Here, a beamformer providing beamforming generates a reinforced audio signal for the desired direction.

However, in a speech recognition technology using a microphone array consisting of a plurality of microphones, an electronic device attempts speech recognition for all audio signals that can be input.

Accordingly, in an environment wherein continuous noise is generated such as a device reproducing continuous noise, an effective speech recognition method for a speech recognition device to select a sound source for speech recognition is required.

DETAILED DESCRIPTION OF THE INVENTION

Technical Problem

The disclosure is for addressing the aforementioned need, and the purpose of the disclosure is in, when continuous noise is generated in a surrounding environment of an electronic device, making the electronic device recognize that it is a situation wherein noise is generated, and provide only a voice command for recognition excluding noise to an automatic speech recognition (ASR) engine.

Technical Solution

A control method of an electronic device according to an embodiment of the disclosure may include the steps of receiving a plurality of audio signals output from a plurality of sources through a plurality of microphones, analyzing the plurality of audio signals and obtaining information on directions in which the plurality of audio signals are input and information on input times of the plurality of audio signals, determining a target source for speech recognition among the plurality of sources based on the obtained information on the directions in which the plurality of audio signals are input and the obtained information on the input times of the plurality of audio signals, and processing an audio signal obtained from the determined target source.

Also, the step of determining a target source may further include the steps of determining the signal sizes of the plurality of audio signals, determining input duration times of audio signals based on the information on the input times of the plurality of audio signals, and identifying at least one audio signal exceeding a predetermined minimum signal size and a predetermined minimum input time among the plurality of audio signals, and a target source for speech recognition may be determined based on information on the direction in which the identified at least one audio signal is input and information on the input time of the identified at least one audio signal.

In addition, the step of determining a target source may further include the step of determining whether the directions in which the audio signals are input has been changed, and a source outputting an audio signal of which direction that the signal is input is changed among the identified at least one audio signal may be determined as a target source.

Also, the step of determining whether the directions in which the audio signals are input has been changed may further include the step of determining an angle at which the directions in which the audio signals are input is changed during a predetermined time period, and based on the determined angle of change being within a predetermined angle, the directions in which the audio signals are input may be determined to be the same during the predetermined time period.

In addition, in the step of determining a target source, a source outputting an audio signal of which signal input duration time is short among the identified at least one audio signal may be determined as a target source.

Also, in the step of determining input duration times of audio signals, based on the determined signal sizes being input as signal sizes smaller than the predetermined minimum signal size exceeding a predetermined time period, the input duration times of the audio signals may be initialized.

In addition, the control method may include the step of, based on two or more audio signals exceeding a predetermined minimum signal size and a predetermined minimum input time being identified among the plurality of audio signals, determining a target source for speech recognition based on information on directions and information on input times for two audio signals having the biggest signal sizes among the identified audio signals.

Also, the control method may include the step of, based on identifying there being one audio signal exceeding a predetermined minimum signal size and a predetermined minimum input time among the plurality of audio signals, determining a source outputting the identified audio signal as a target source.

In addition, in the step of processing, information corresponding to an audio signal obtained from the determined target source may be transmitted to an external server.

An electronic device according to an embodiment of the disclosure may include a plurality of microphones, and a processor configured to analyze a plurality of audio signals output from a plurality of sources received through the plurality of microphones and obtain information on directions in which the plurality of audio signals are input and information on input times of the plurality of audio signals, determine a target source for speech recognition among the plurality of sources based on the obtained information on the directions in which the plurality of audio signals are input and the obtained information on the input times of the plurality of audio signals, and process an audio signal obtained from the determined target source.

Also, the processor may determine the signal sizes of the plurality of audio signals, determine input duration times of audio signals based on the information on the input times of the plurality of audio signals, and identify at least one audio signal exceeding a predetermined minimum signal size and a predetermined minimum input time among the plurality of audio signals, and determine a target source for speech recognition based on information on the direction in which the identified at least one audio signal is input and information on the input time of the identified at least one audio signal.

In addition, the processor may determine whether the directions in which the audio signals are input has been changed, and determine a source outputting an audio signal of which direction that the signal is input is changed among the identified at least one audio signal as a target source.

Also, the processor may determine whether the directions in which the audio signals are input has been changed, determine an angle at which the directions in which the audio signals are input is changed during a predetermined time period, and based on the determined angle of change being within a predetermined angle, determine that the directions in which the audio signals are input are the same during the predetermined time period.

In addition, the processor may determine a source outputting an audio signal of which signal input duration time is short among the identified at least one audio signal as a target source.

Also, the processor may, based on the determined signal sizes being input as signal sizes smaller than the predetermined minimum signal size exceeding a predetermined time period, initialize the input duration times of the audio signals.

In addition, the processor may, based on two or more audio signals exceeding a predetermined minimum signal size and a predetermined minimum input time being identified among the plurality of audio signals, determine a target source for speech recognition based on information on directions and information on input times for two audio signals having the biggest signal sizes among the identified audio signals.

Also, the processor may, based on identifying there being one audio signal exceeding a predetermined minimum signal size and a predetermined minimum input time among the plurality of audio signals, determine a source outputting the identified audio signal as a target source.

In addition, the electronic device may further include a communicator, and the processor may control the communicator to transmit information on an audio signal obtained from the determined target source to an external server.

Effect of the Invention

According to the disclosure, in a situation wherein a plurality of audio signals are input by a plurality of sources, a target source, i.e., a user's speech can be tracked stably and separated. If the direction of a user's speech is tracked stably, there is an effect that a conventional speech preprocessing technology can extract a sound in the direction more correctly, and thereby improve a recognition performance of a speech in a far distance.

Also, as the electronic device of the disclosure analyzes only audio excluding noise at a speech recognition part or a speech recognition server, there is an effect that unnecessary operations can be prevented.

BRIEF DESCRIPTION OF DRAWINGS

FIG. 5A and FIG. 5B are sequence diagrams for illustrating a method for an electronic device to select an audio signal output by a target source among a plurality of audio signals, and perform a function corresponding to a voice command according to an embodiment of the disclosure;

BEST MODE FOR IMPLEMENTING THE INVENTION

Figure 1:
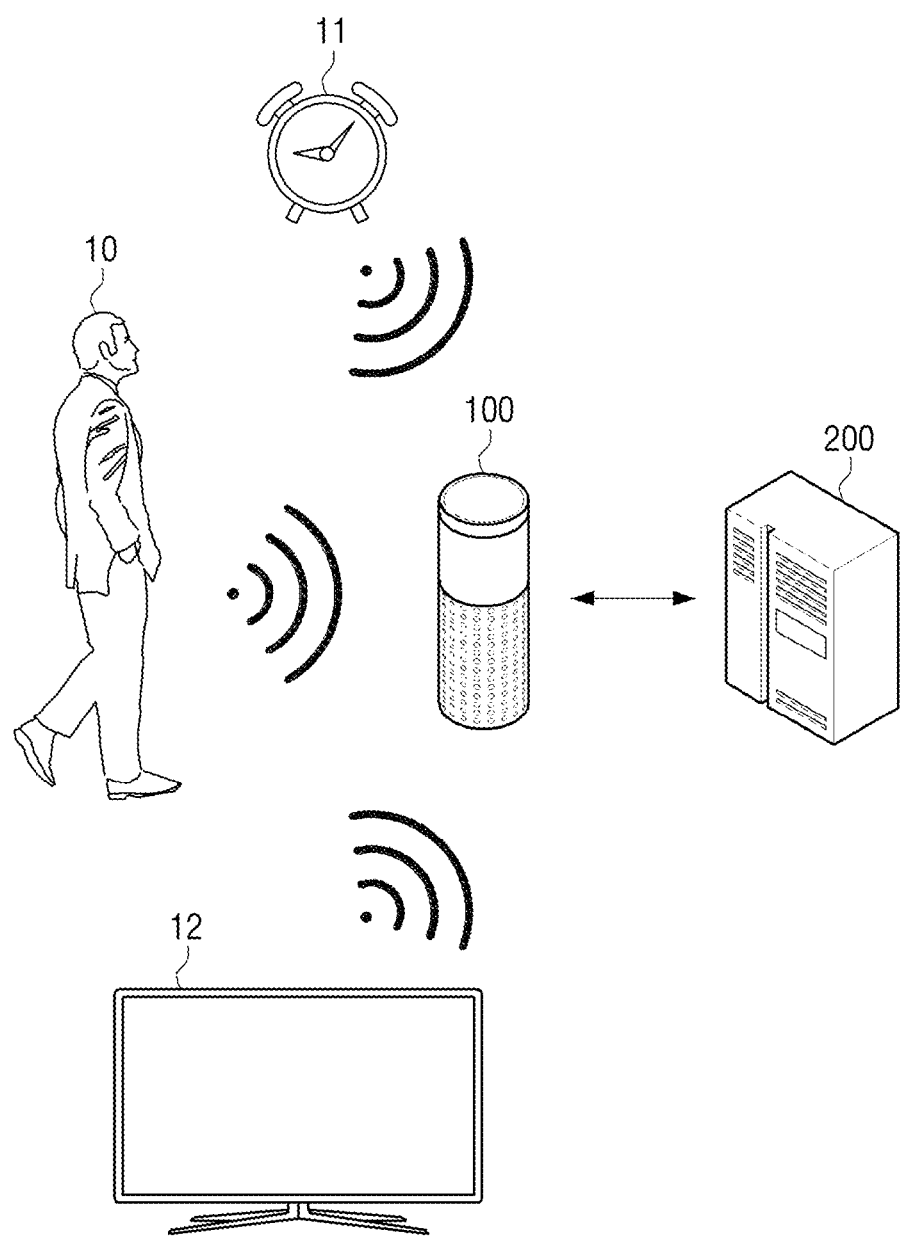
FIG. 1 is a diagram for illustrating a speech recognition environment of an electronic device according to an embodiment of the disclosure.

Hereinafter, various embodiments of the disclosure will be described with reference to the accompanying drawings. However, it should be noted that the various embodiments are not for limiting the technology described in the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Further, the expressions "first," "second" and the like used in the disclosure may be used to describe various elements regardless of any order and/or degree of importance. Also, such expressions are used only to distinguish one element from another element, and are not intended to limit the elements. For example, a first user device and a second user device may refer to user devices that are different from each other, regardless of any order or degree of importance. Also, for example, a first element may be called a second element, and a second element may be called a first element in a similar manner, without departing from the scope of protection described in the disclosure.

In addition, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element). In contrast, the description that one element (e.g.: a first element) is "directly coupled" or "directly connected" to another element (e.g.: a second element) can be interpreted to mean that still another element (e.g.: a third element) does not exist between the one element and the another element.

Meanwhile, the terms used in the disclosure are just used to explain certain embodiments of the disclosure, and are not intended to limit the scope of the other embodiments. Also, singular expressions may include plural expressions, unless defined obviously differently in the context. The terms used herein, including technical or scientific terms, may have meanings identical to those generally known to those of ordinary skill in the art described in the disclosure. Terms defined in general dictionaries among the terms used in the disclosure may be interpreted to have the same meaning as or a similar meaning to the contextual meaning in the related art. Unless defined obviously in the disclosure, the terms used herein may not be interpreted to have an ideal or overly formal meaning. Depending on cases, even terms defined in the disclosure may not be interpreted to exclude the embodiments of the disclosure.

Hereinafter, various embodiments of the disclosure will be described in detail with reference to the accompanying drawings. Hereinafter, a source will have the same meaning as a sound source, and a target source will have the same meaning as a subject of speech recognition, a sound source to be recognized, and a source to be recognized.

FIG. 1 is a diagram for illustrating a speech recognition environment of an electronic device according to an embodiment of the disclosure.

Referring to FIG. 1, an electronic device 100 may be located in an environment wherein a plurality of audio signals generated from a plurality of sources, i.e., a user 10 and external sound sources 11, 12 are input. Here, the external sound sources 11, 12 are respectively illustrated as an alarm clock and a TV, but this is merely an example, and they may be various sound sources.

According to an embodiment of the disclosure, the electronic device 100 may be a speech recognition device including a plurality of microphones. Here, the plurality of microphones have the same meaning as multiple microphones, a microphone array, and a mike array. In FIG. 1, it is illustrated that the electronic device is implemented in the form of an AI speaker, but this is merely an example, and the electronic device may be implemented as various electronic devices such as a smart TV, a smartphone, a desktop PC, a tablet PC, a laptop PC, a navigation, etc.

The electronic device 100 may receive an audio signal including a voice command for performing an operation from the user 10 through the plurality of microphones. Here, the electronic device 100 may recognize audio signals generated from the external sources 11, 12 as noises, and determine only the speech audio signal uttered by the user 10 as the audio signal to be recognized.

Specifically, the electronic device 100 may obtain information on the directions in which a plurality of audio signals generated from the plurality of sources 10, 11, 12 are input and information on the input times of the plurality of audio signals. Here, the information on the directions in which audio signals are input may mean angles formed by the directions in which audio signals are input based on one direction. Also, the information on the input times of the plurality of audio signals may include information on the time when audio is input into the electronic device, information on the duration time when audio signals are continuously input, and information on a predetermined number of frames that pass while audio signals are input.

The electronic device 100 may distinguish and determine a noise audio signal and an audio signal including a user voice command through the information on the directions in which the plurality of audio signals are input and the information on the input times of the plurality of audio signals.

For example, the electronic device 100 may determine an audio signal which is input while its direction is changed among the plurality of audio signals as the audio signal to be recognized. This is because there are many cases wherein the locations of the external sources 11, 12 generating continuous noises are not changed in general, and the electronic device 100 receives input of such noise audio signals in a specific direction. However, this is merely an example, and methods for the electronic device 100 to determine an audio signal to be recognized are not limited thereto.

As another example, the electronic device 100 may determine an audio signal of which input duration time is relatively short among the plurality of audio signals as the audio signal to be recognized. This is because there are many cases wherein a user makes a concise command for an operation to be performed, like "Tell me about today's weather" when inputting a voice command for the electronic device 100, in general. However, this is merely an example, and methods for the electronic device 100 to determine an audio signal to be recognized are not limited thereto.

The method for the electronic device 100 to distinguish and determine continuous noises and a user voice command through information on the directions in which a plurality of audio signals are input and information on the input times of the plurality of audio signals as described above will be described in detail later.

When the electronic device 100 determines an audio signal to be recognized, the electronic device 100 may determine a source outputting the audio signal to be recognized as a target source. The electronic device 100 may continuously track the target source, and obtain an audio signal output by the target source. Also, the electronic device 100 may perform speech recognition processing through a speech recognition part inside the electronic device 100 for obtaining a voice command included in the obtained audio signal.

Meanwhile, this is merely an example, and the electronic device 100 may transmit information related to an audio signal to an external server and an external device for obtaining a voice command. Here, the information related to an audio signal may be information on conversion of an obtained analog audio signal into a digital audio signal. In this case, a component for speech recognition may exist in a separate server, or it may be implemented separately through an external speech recognition device.

Meanwhile, although not illustrated in FIG. 1, the electronic device 100 may communicate with other external devices through wireless or wired communication. The electronic device 100 may transmit and receive data so that an external device performs a function corresponding to a voice command received from a target source. Here, the type of the external device may be an electronic device that can output image contents. For example, in case an external device is a television, the type of the external device is an image device, and information on output data of the television may include the model name of the television, the audio characteristics of the output contents of the television, the frequency characteristics of the output audio among the output contents of the television, etc., but are not limited thereto. Also, the external device may include a remote control, a Bluetooth speaker, a lighting device, a smart cleaner, a smart refrigerator, an IOT home manager, etc. other than a device that can output image contents.

Meanwhile, in case the electronic device 100 is implemented as an electronic device wherein applications can be installed such as a smartphone, a smart TV, a smart remote control, etc., the electronic device 100 may operate an application for controlling an external device to perform a function corresponding to a recognized voice command. Such an application may exist on the electronic device 100 from the time of release.

For example, a user may operate an application inside the electronic device 100 and input a voice command like "Play the A movie." Then, the electronic device 100 may recognize the voice command input from the user 10 among the plurality of audio signals, and transmit a control signal for performing a function corresponding to the voice command to an external device connected with the electronic device 100 that can output image contents. Also, although not illustrated in FIG. 1, the electronic device 100 may not only receive a plurality of audio signals through the microphone inside the electronic device 100, but also receive audio signals received at an external device connected with the electronic device 100. In this case, the external device connected with the electronic device 100 may be a remote control including a microphone, but is not limited thereto.

In this case, the electronic device 100 may receive together information on the directions in which a plurality of audio signals are input, information on audio signal sizes, and information on the times when audio signals are input from a connected external device. Then, the electronic device 100 may determine an audio signal to be recognized among the plurality of audio signals based on the received information. Here, the electronic device 100 may obtain a voice command through an external server or an external device based on information on an audio signal obtained from the source outputting the audio signal to be recognized, but the disclosure is not limited thereto, and the electronic device 100 may obtain a voice command through the voice recognition part of the electronic device 100 itself. In this case, the electronic device 100 may perform a function corresponding to a voice command included in the obtained audio signal. That is, even if a user does not directly input a voice command into the electronic device 100, the user may input an audio signal including a voice command through an external device connected with the electronic device 100 like a remote control, and make the electronic device 100 perform a function corresponding to the voice command.

For example, in case the electronic device 100 is implemented as an AI speaker, if a user inputs a voice command like "Play exciting music" into a remote control including a microphone, the electronic device 100 may recognize the voice command of the user based on an audio signal received from the remote control. Afterwards, the electronic device 100 may output exciting music in response to the user command.

Alternatively, as described above, the electronic device 100 may transmit and receive a control signal so that an external device that received input of an audio signal or another external device connected with the electronic device 100 performs a function corresponding to an obtained voice command. That is, a user may input an audio signal including a voice command through a microphone included in an external device, and make not only the electronic device 100 but also another external device connected with the electronic device 100 wirelessly or via wire perform a function corresponding to the voice command.

For example, if a user inputs a voice command like "Turn on the air conditioner" into a remote control including a microphone, the electronic device 100 may recognize the voice command of the user based on an audio signal received from the remote control. Afterwards, the electronic device 100 may transmit a control signal to the air conditioner so that the power of the air conditioner connected wirelessly or via wire is turned on.

The aforementioned embodiment is merely an example, and a user may control the electronic device 100 or another external device through various external devices.

Figure 2A:
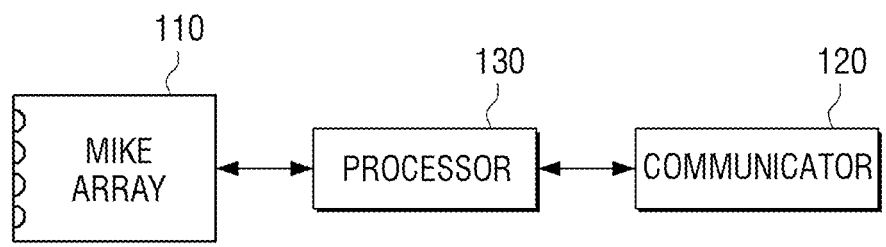
FIG. 2A and FIG. 2B are diagrams for illustrating components of an electronic device according to an embodiment of the disclosure.
Figure 2B:
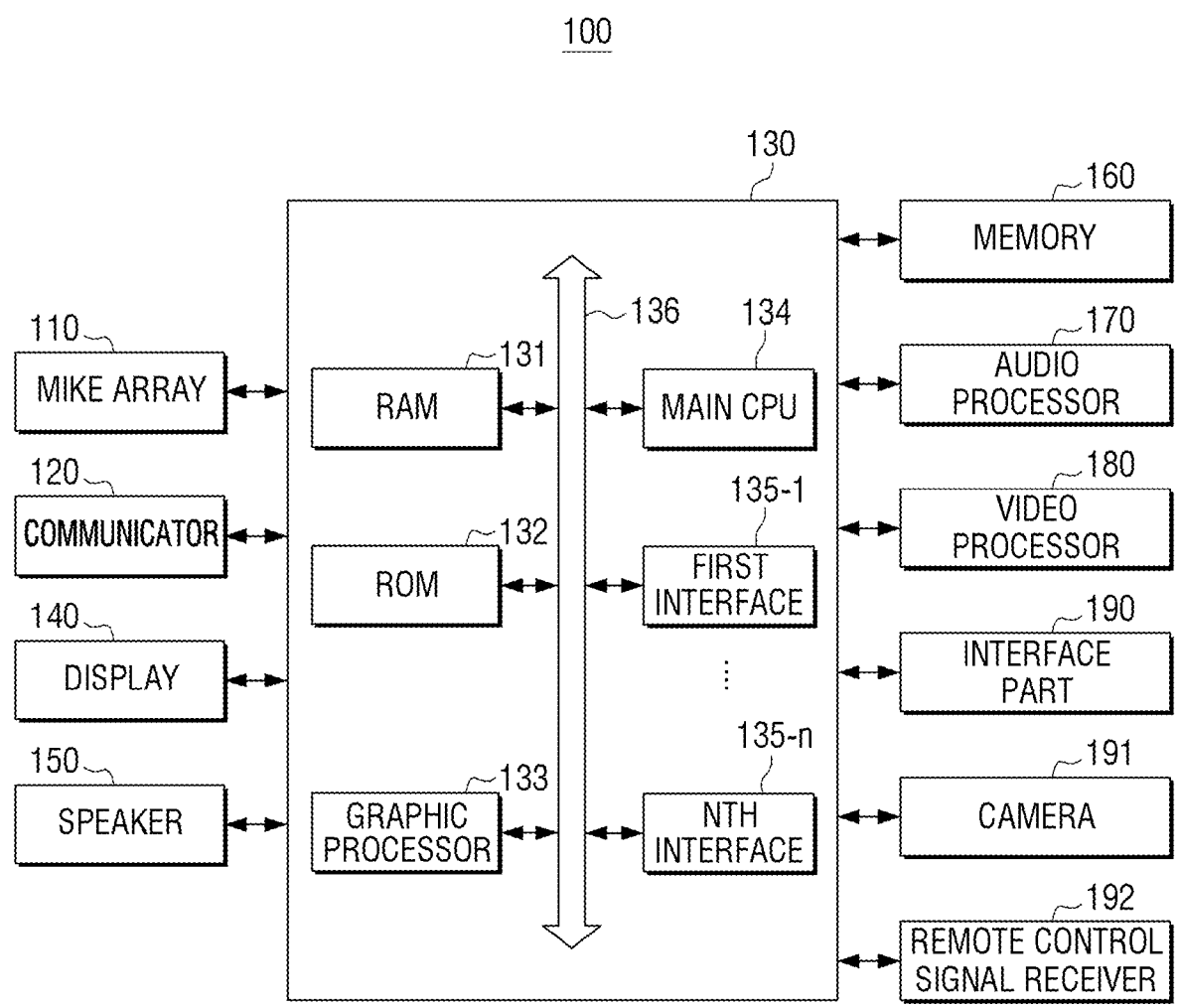

FIG. 2A and FIG. 2B are diagrams for illustrating components of an electronic device according to an embodiment of the disclosure.

FIG. 2A is a simple block diagram for illustrating components of an electronic device. Referring to FIG. 2A, the electronic device 100 may include a mike array 110, a communicator 120, and a processor 130.

The mike array 110 may receive audio signals from a plurality of sound sources including voice signals of a user. In an audio signal, a voice signal may be included. For example, the mike array 110 may receive a voice signal for remotely controlling the electronic device 100 from the user 10 illustrated in FIG. 1 through a user voice, and receive audio signals output by the external sources 11, 12. An analog audio signal input through such a mike array 110 may be converted into a digital signal and transmitted to the processor.

According to an embodiment of the disclosure, the mike array 110 may have a mike array component consisting of a plurality of (for example, four) microphones. In the disclosure, a microphone array including four microphones is illustrated, but the number of microphones is not limited thereto.

The mike array consisting of a plurality of microphones may estimate an input direction and an input distance of a sound source by using gain and delay information of audio input signals for each microphone. According to an embodiment of the disclosure, the mike array may consist of directional or omnidirectional microphones, and may be a component wherein directional microphones and omnidirectional microphones are mixed.

The communicator 120 is a component for communicating with the external server 200. The communicator 120 may transmit an audio signal generated from a target source (for example, a user) selected at the processor among a plurality of sound sources to the external server 200 or an external device. Also, the communicator 120 may receive result data of STT processing performed at the external server 200 or result data of speech recognition.

The communicator 120 may communicate with other external devices. Here, the type of an external device may be an electronic device that can output image contents. For example, in case an external device is a television, the type of the external device is an image device, and information on output data of the television may include the model name of the television, the audio characteristics of the output contents of the television, the frequency characteristics of the output audio among the output contents of the television, etc., but are not limited thereto. Also, an external device communicating with the communicator 120 may include a remote control, a Bluetooth speaker, a lighting device, a smart cleaner, a smart refrigerator, an IOT home manager, etc. other than a device that can output image contents.

In the case of communicating with an external device including a microphone, the communicator 120 may receive information on an audio signal received by the external device. Here, the information on the audio signal may be a digital audio signal converted from an analog audio signal received by the external device.

Meanwhile, the communicator 120 may receive state information of an external device according to information on connection with the electronic device 100. The state information of an external device may be at least one of whether the external device and the electronic device 100 are connected, information on audio sizes from image contents output by the external device, the type of the external device, the location of the external device, the angle of the external device, the distance from the external device to the electronic device 100, or the frequency characteristic of a speaker for outputting of image contents of the external device. Here, image contents may include video and/or audio.

Whether the external device and the electronic device 100 are connected may indicate whether the external device is connected, or is not connected with the electronic device 100 through wireless communication. Information on audio sizes output by the external device may indicate information on audio sizes by which it is determined whether audio sizes output by the external device can be recognized as noises based on energy size of a voice signal of a user recognized at the electronic device 100.

The angle of the external device may indicate the relative angle between the output speaker of the external device and the microphone 110 of the electronic device 100 based on the electronic device 100. For example, the angle from the electronic device 100 to the external device may be predicted (determined) by using the delay time among signals input into each microphone of the plurality of microphones. Then, the electronic device 100 may determine the relative location information between the external device and the electronic device 100 from the predicted angle.

The frequency characteristic of a speaker for outputting of audio of the external device is the basic characteristic indicating the characteristic of the speaker, and it may be data necessary for predicting the reproduction band, the balance of the pitch energy, and approximate sound quality, but is not limited thereto. The processor 130 may obtain information on audio input directions, information on audio signal sizes, and information on audio input times for a plurality of audio signals received through the mike array 110. Also, the processor 130 may determine an audio signal regarding a voice command for controlling the electronic device 100 based on the obtained information on audio directions, size information, and time information. The processor 130 may determine a source outputting the determined audio signal as a target source, and control the communicator 120 to transmit the audio signal output by the determined target source to the external server 200.

Meanwhile, the communicator 120 may include a communication module for at least one communication method among wireless fidelity (Wi-Fi), Bluetooth (BT), near field communication (NFC), a global positioning system (GPS), or Ethernet or cellular communication through a carrier sense multiple access/collision detection (CSMA/CD) method (e.g.: LTE, LTE-A, CDMA, WCDMA, UMTS, Wibro, or GSM, etc.). The communicator 120 may be implemented as a plurality of communicators corresponding to at least one communication module as described above.

According to an embodiment of the disclosure, the communicator 120 may use a Wi-Fi module for communicating with an external device like a remote control and the external server 200. Alternatively, in case the communicator 120 is implemented as a plurality of communicators, the communicator 120 may use a communicator including at least one of an Ethernet modem or a Wi-Fi module for communicating with the external server 200, and may use a communicator including a BT module for communicating with an external device like a remote control. However, this is merely an example, and the disclosure is not limited thereto.

The processor 130 controls the overall operations of the program module stored in the memory and the electronic device 100, and detailed description of the processor 130 will be made in FIG. 3 later.

FIG. 2B is a detailed block diagram for illustrating components of an electronic device.

Referring to FIG. 2B, the electronic device 100 may include a mike array 110, a communicator 120, a processor 130, a display 140, a speaker 150, a memory 160, an audio processor 170, a video processor 180, an interface part 190, a camera 191, and a remote control signal receiver 192. Also, the processor 130 may include a RAM 131, a ROM 132, a graphic processor 133, a main CPU 134, and a first interface 135-1 to an nth interface 135-n.

As the mike array 110 and the communicator 120 were described in FIG. 2A, description in this regard will be omitted. Meanwhile, the processor 130 will be described in detail in FIG. 3.

The display 140 may display at least one of various screens generated at the graphic processor 133 or video frames processed at the video processor 180, for performing a function corresponding to a voice command recognized by the electronic device 100.

The display 140 may be implemented as a liquid crystal display panel (LCD), organic light emitting diodes (OLED), etc., but is not limited thereto. Also, the display 140 may be implemented as a flexible display, a transparent display, etc. depending on cases.

Also, the display 140 according to an embodiment of the disclosure may include not only a display panel outputting images, but also a bezel housing a display panel. In particular, a bezel according to an embodiment of the disclosure may include a touch detector (not shown) for detecting a user interaction.

The speaker 150 is a component outputting various kinds of notification sounds or voice messages as well as various kinds of audio data processed at the audio processor 170. In particular, in case a content displayed on the display 140 is a content related to music, the speaker 150 may output the sound source of the reproduced content.

The memory 160 may store various data for the overall operations of the electronic device 100 such as a program for processing or control of the processor 130, etc. Also, the memory 160 may store a plurality of application programs or applications operated at the electronic device 100, and data and commands for the operations of the electronic device 100. At least some of such application programs may be downloaded from an external server through wireless communication. Also, at least some of such application programs may exist on the electronic device 100 from the time of release for the basic functions of the electronic device 100. Application programs may be stored in the memory 160, and operated by the processor 130 to perform the operations (or functions) of the electronic device 100.

The memory 160 may be implemented as a non-volatile memory, a volatile memory, a flash-memory, a hard disc drive (HDD), or a solid state drive (SSD), etc. The memory 160 may be accessed by the processor 130, and reading/recording/correction/deletion/update, etc. of data by the processor 130 may be performed. In the disclosure, the term memory may include the memory 160, and a ROM 131 and a RAM 132 inside the processor 130, or a memory card (not shown) installed on the electronic device 100 (for example, a micro SD card, a memory stick, a USB memory, etc.). Also, the memory 160 may include a buffer that temporarily stores various data of music contents.

The audio processor 170 is a component performing processing of audio data. At the audio processor 170, various types of processing such as decoding or amplification, noise filtering, etc. of audio data may be performed. Meanwhile, the audio processor 170 may include a plurality of audio processing modules for processing audio corresponding to a plurality of contents.

The video processor 180 is a component performing processing for a content that the electronic device 100 displays to perform a function through a voice command. At the video processor 180, various types of image processing such as decoding, scaling, noise filtering, frame rate conversion, resolution conversion, etc. of video data may be performed. Meanwhile, the video processor 180 may include a plurality of video processing modules for processing video corresponding to a plurality of contents.

The interface part 190 is a component for connecting an external device and the electronic device 100 for inputting and outputting video and audio. Specifically, the interface part 190 may include at least one of a universal serial bus (USB), a high definition multimedia interface (HDMI), a recommended standard 232 (RS-232), a plain old telephone service (POTS) DVI, a display port (DP), or a thunderbolt which are components for wired communication. An HDMI is an interface that can transmit high performance data for AV devices outputting audio and video. A DP is an interface that can implement screens of ultra high definition like 2560×1600 or 3840×2160 as well as screens of full HD like 1920×1080, and 3D stereoscopic images, and can also transmit digital voices. A thunderbolt is an input/output interface for transmission and connection of high speed data, and can connect in parallel all of a PC, a display, a storage device, etc. with one port.

The aforementioned input/output terminals are merely examples, and the interface part 190 may include a port for outputting only audio signals or a port for outputting only video signals other than the above.

The camera 191 is a component for detecting a user's motion according to the control by the user. In particular, the camera 191 may detect various kinds of user motions for controlling the electronic device 100.

The remote control signal receiver 192 may receive a user's command input through a remote control. The remote control signal receiver 192 may receive a remote control signal through a BT module. Meanwhile, the remote control signal receiver 192 may be included in the communicator 120 for wireless communication depending on embodiments.

The processor 130 controls the overall operations of the electronic device 100 by using various kinds of programs stored in the memory 160.

The processor 130 includes a RAM 131, a ROM 132, a graphic processor 133, a main CPU 134, first to nth interfaces 135-1 to 135-n, and a bus 136, as illustrated in FIG. 2B. Here, the RAM 131, the ROM 132, the graphic processor 133, the main CPU 134, and the first to nth interfaces 135-1 to 135-n may be connected with one another through the bus 136.

In the ROM 132, a set of commands, etc. for system booting are stored. When a turn-on command is input and power is supplied, the main CPU 134 copies the O/S stored in the memory 160 in the RAM 131 according to the command stored in the ROM 132, and boots the system by executing the O/S. When booting is completed, the main CPU 134 copies the various types of application programs stored in the memory 160 in the RAM 131, and performs various types of operations by executing the application programs copied in the RAM 131.

The graphic processor 133 generates a screen including various objects such as icons, images, texts, etc. by using an operation part (not shown) and a rendering part (not shown). The operation part operates attribute values such as coordinate values, shapes, sizes, and colors by which each object will be displayed according to the layout of the screen by using a control command received from the communicator 120. The rendering part generates screens in various layouts including objects, based on the attribute values operated at the operation part. The screens generated at the rendering part are displayed in the display area of the display 140.

The main CPU 134 accesses the memory 160, and performs booting by using the O/S stored in the memory 160. Also, the main CPU 134 performs various operations by using various kinds of programs, contents, data, etc. stored in the memory 160.

The first to nth interfaces 135-1 to 135-n are connected with the aforementioned various kinds of components. One of the interfaces may be a network interface connected with an external device through a network.

According to an embodiment of the disclosure, the processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA).

Figure 3:
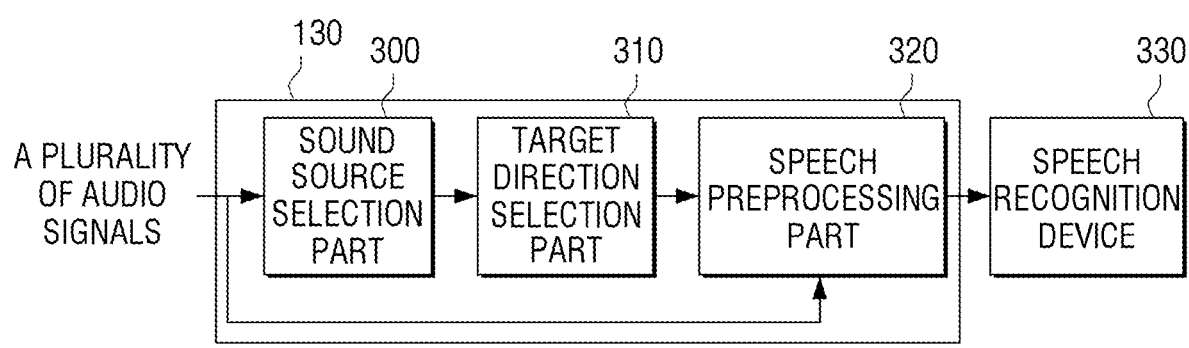
FIG. 3 is a block diagram for illustrating in detail components of a processor according to an embodiment of the disclosure.

FIG. 3 is a block diagram for illustrating in detail components of a processor.

Referring to FIG. 3, the processor 130 may include a sound source direction tracking part 300, a target direction selection part 310, and a speech preprocessing part 320.

The sound source direction tracking part 300 is a component for tracking the directions of a plurality of audio signals simultaneously based on a plurality of mike arrays. With respect to a plurality of audio signals received through a plurality of mikes, the sound source direction tracking part 300 may track a plurality of sources outputting a plurality of audio signals based on information on the directions in which audio is input.

Specifically, the sound source direction tracking part 300 may sum up the cross-correlations between two adjacent mike signals converted into frequency areas through short-time Fourier transformation, and obtain the directions of sound sources for each time-frequency bin. The sound source direction tracking part 300 may track the directions of a plurality of audio signals simultaneously through a method of clustering the directions of sound sources for each time-frequency bin as histograms for each frame.

Here, the detection performance of directions of sound sources is influenced by environmental noises, etc., and the sound source direction tracking part 300 may use information in a signal such as Signal-to-Noise Ratio (SNR), etc. for compensating this influence. Also, the sound source direction tracking part 300 may restrict frequency areas for reducing errors that may occur due to a detection algorithm structure. For example, in the case of applying a Circular Integrated Cross-Spectrum (CICS) to detection of directions, the detection performance can be improved if $fmax < \frac{1}{4} * c/Dmax$ is applied to the maximum frequency area or elements constituting the CICS are changed. Here, c is the moving speed of a sound wave, and Dmax indicates the distance between microphones. Through such a method, the sound source direction tracking part 300 may track a plurality of audio directions for every signal frame.

Meanwhile, the sound source direction tracking part 300 may define only audio signals having a signal size (P) over a specific level and having an audio input duration time (Le) over a specific level like voices as meaningful audio events, and track only them. Also, even if audio signals are cut off and are not input anymore, the sound source direction tracking part 300 may maintain the previous direction until audio signals are additionally input in another direction and output the audio signals for a preprocessing process later. Through this, the sound source direction tracking part 300 may avoid tracking of a clashing sound or a transient noise, and reduce misrecognition due to such sounds.

The target direction selection part 310 is a component for selecting the direction of an audio signal which becomes the subject of speech recognition among a plurality of audio signals tracked by the sound source direction tracking part 300. That is, the target direction selection part 310 may determine a target source for speech recognition based on information on the directions in which a plurality of audio signals are input and information on the input times of the plurality of audio signals.

Specifically, first, the target direction selection part 310 may identify two audio signals having a signal size exceeding a signal size (P) over a specific level and having an audio input duration time (Le) over a specific level for every frame. Here, identifying two audio signals is merely an example, and audio signals in a predetermined number may be identified. The target direction selection part 310 may determine an index $\Phi i(k)$ indicating the direction or the angle of an identified audio signal. Such an index may be output together with the beamforming energy Pi(k) in each direction from the sound source direction tracking part 300.

In case the index $\Phi i(k)$ of the current kth frame of the identified audio signal is within a predetermined size (within a specific range) compared with the index $\Phi i(k-1)$ of the k–1th frame, the target direction selection part 310 may replace the kth index $\Phi i(k)$ by the k–1th index $\Phi i(k-1)$. Through this, in case input directions of audio signals slightly change, the electronic device 100 may determine that the audio signals were input in the same direction.

In case the index $\Phi i(k)$ of the current frame is identical to the index $\Phi i(k-1)$ of the previous frame or has a difference within a predetermined size, the target direction selection part 310 may increase Du(1) and Du(2) which are counters indicating the continuity of the directions of each audio signal by 1, and if the index $\Phi i(k)$ is different from the previous value, the target direction selection part 310 may store Du as Duo, and at the same time, initialize it as 1.

In case the energy Pi of an audio signal is smaller than the predetermined signal size P, the target direction selection part 310 may output the previous index, and increase Du by 1. This is for maintaining the previous direction until audio signals are input in another direction for a preprocessing process later even if audio signals input into the electronic device 100 are cut off instead of being input regularly.

Meanwhile, if a tracked audio signal lasts as long as a predetermined period (a predetermined number of frames) with energy smaller than P, the target direction selection part 310 may initialize the angle index and the counters. For example, in case the electronic device 100 does not additionally receive input of an audio signal exceeding a predetermined period after receiving input of a wake-up word (or a trigger) which is "Hi, Bixby" from a user, the electronic device 100 may initialize the angle index and the counters.

Figure 4:
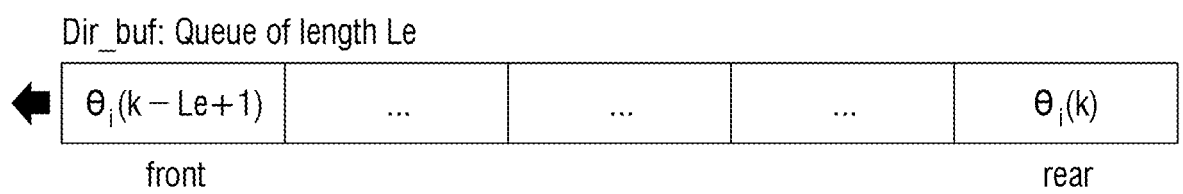
FIG. 4 is a diagram for illustrating a buffer for selecting the direction of an audio signal according to the input duration time according to an embodiment of the disclosure.

The target direction selection part 310 may include a buffer Dir_buf in a queue form having a length of Le as in FIG. 4 for selecting the direction of an audio signal having an input duration time of greater than or equal to Le. Even if angles change in the meantime inside the buffer, if the starting angle value and the ending angle value of the buffer coincide, the target direction selection part 310 may replace the entire angles inside the buffer by the starting value. This is for preventing an error that another angle is pointed temporarily due to spatial aliasing or a transient noise, etc. within a short section.

In case it is determined that both Du(i)s of two audio signals were input during a duration time of greater than or equal to Le, the target direction selection part 310 may store the angle at which the audio signal having the smaller Du(i) is input as the audio signal angle DirT(k) of the target source. This is because there are many cases wherein a user concisely inputs a voice command focused on a voice command when inputting a voice command into the electronic device 100, in general.

In case the angle value of one audio signal becomes different from that of the previous frame among the directions of the two audio signals, the target direction selection part 310 may initialize the Du(i) of the audio signal as 1. Here, in case only the Du(i) of the remaining audio signal is greater than or equal to Le, the target direction selection part 310 may select the audio signal having the Du(i) greater than or equal to Le as the angle DirT(k) of the audio signal of the target source.

In case both Du(i)s of two audio signals are smaller than Le, the target direction selection part 310 may select the direction in which the audio signal having a relatively bigger counter is input among the audio signals as the angle DirT(k) of the audio signal of the target source.

In case there is one tracked audio signal, the target direction selection part 310 may select the angle of the audio signal as the angle DirT(k) of the audio signal of the target source regardless of Du.

Meanwhile, the angle DirT(k) of the target source identified in the kth frame may be the angle θi(−+1) calculated in the previous frames of an Le-1 number. In case the electronic device 100 performs an operation of tracking the direction of an audio signal, frame delays of a minimum a number occur, and accordingly, if speech preprocessing like beam forming or audio separation is performed based on the angle calculated in the current frame, the electronic device 100 cannot respond to real time change of the direction of the sound source. Accordingly, processing should be performed by delaying a mike signal input in preprocessing as much as the number of frames of greater than or equal to Le+α at the minimum.

The speech preprocessing part 320 may separate only an audio signal to be recognized and amplify the signal, for transmitting an audio signal output by a target source to an external server, etc.

Specifically, the speech preprocessing part 320 may extract audio generated at the angle of the audio signal of the target source through a generalized sidelobe canceller (GCC) amplifying the audio signal in the direction based on the angle DirT(k) of the audio signal of the target source input from the target direction selection part 310, or a geometric source separation (GSS) algorithm separating the audio signal of the target source and ambient noises for each audio in each direction. The speech preprocessing part 320 may transmit and deliver the extracted audio to the speech recognition device 330 through the communicator 120.

Meanwhile, the speech recognition device 330 may be an external server 200, or it may be included as a speech recognition part (not shown) in the electronic device 100. The speech recognition device 330 may perform an STT process for a received audio signal. STT-processed data may include a user's voice command. Here, a component for extracting a user's voice command from the STT-processed data may be included in the speech recognition device 330, but according to an embodiment of the disclosure, the speech recognition device 330 may perform only the role of an STT server, and a component extracting a user voice command may be included in a separate server or device. Afterwards, the electronic device 100 may perform a function corresponding to the extracted user voice command, and may transmit the user voice command to an external device so that an external device connected with the electronic device 100 performs a function corresponding to the extracted user voice command.

Figure 5B:
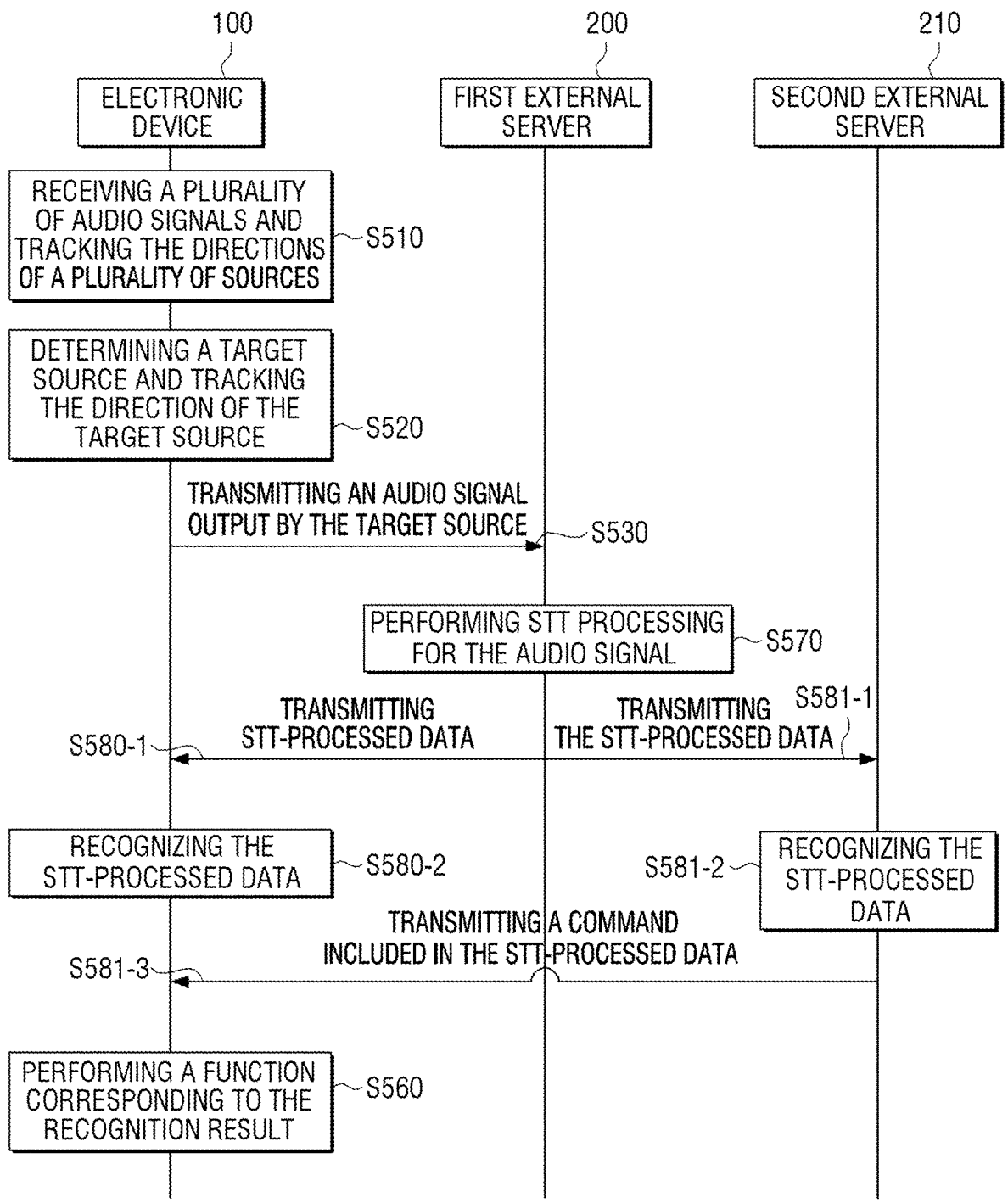

FIG. 5A and FIG. 5B are sequence diagrams for illustrating a method for an electronic device to select an audio signal output by a target source among a plurality of audio signals, and perform a function corresponding to a voice command obtained through an external server according to an embodiment of the disclosure.

Referring to FIG. 5A, the electronic device 100 may receive a plurality of audio signals output by a plurality of sources through the mike array 110 consisting of a plurality of microphones. Also, the electronic device 100 may track directions for the plurality of sources based on information on the directions in which the plurality of audio signals are input at operation S510.

Based on the information on the directions in which the plurality of received audio signals are input and the information on the duration times that the audio signals are input, the electronic device 100 may select the audio signal output by the target source. Here, the target source may be a source that the electronic device 100 determined as a subject of speech recognition, e.g., a user. The electronic device 100 may select the audio signal output by the target source, and track the location or direction of the target source at operation S520.

Afterwards, the electronic device 100 may process the audio signal output by the target source, and transmit information related to the audio signal to the external server 200 for speech recognition or the speech recognition device through the communicator 120 at operation S530. Here, the information related to the audio signal may be information regarding conversion of the audio signal in an analog form into a digital audio signal.

The external server 200 that received the information for the audio signal output by the target source from the electronic device 100 may recognize the speech included in the audio signal output by the target source based on the received information at operation S540. Also, the external server 200 may transmit the result of speech recognition to the electronic device 100 at operation S550. The electronic device 100 may perform a function corresponding to the result of speech recognition received from the external server 200 at operation S560.

Meanwhile, in FIG. 5A, it is illustrated that the external server 200 recognizes a speech from a received audio signal and transmits the result of speech recognition to the electronic device 100, but the external server 200 may perform only the role of an STT server converting data for a speech signal into a text.

Referring to FIG. 5B, the first external server 200 may receive information on an audio signal output by the target source of the electronic device 100. The first external server 200 may be an STT server that performs Speak To Text (STT) processing based on the received information on the audio signal. The first external server 200 may transmit STT-processed data to the electronic device 100 at operation S580-1. The electronic device 100 may recognize a command included in the STT-processed data at operation S580-2, and perform a function corresponding to the recognition result.

Meanwhile, the first external server 200 may transmit the STT-processed data to the second external server 210 at operation S581-1. The second external server 210 may be a server for recognizing a command included in the STT-processed data received from the first external server 200. The second external server 210 may recognize the command included in the STT-processed data at operation S281-S, and transmit the command included in the audio signal to the electronic device 100 based on the recognition result at operation S581-3. Afterwards, the electronic device 100 may perform a function corresponding to the command.

Meanwhile, in FIG. 5A and FIG. 5B, it is illustrated that a process of STT processing and recognizing audio signal data output by a target source is performed in the external servers 200, 210 separate from the electronic device 100, but the electronic device 100 may perform STT processing and recognize a command included in STT-processed data for an audio signal output by a target source through a component for speech recognition included in the electronic device 100 itself, and perform a function corresponding to the command.

Figure 6:
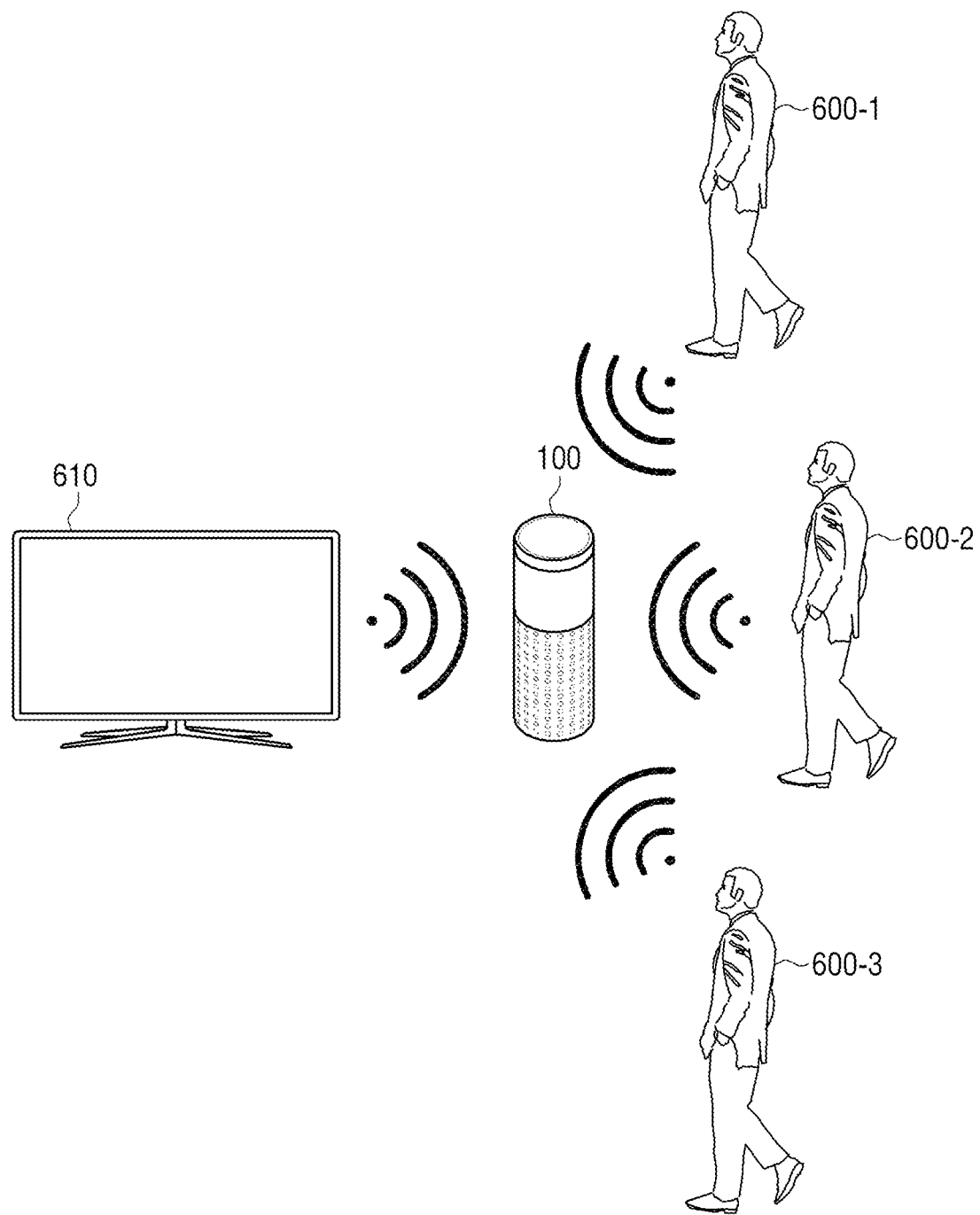
FIG. 6 and FIG. 7 are diagrams illustrating a process wherein an electronic device determines a target source in case the direction of an audio signal input into the electronic device is changed according to an embodiment of the disclosure.
Figure 7:
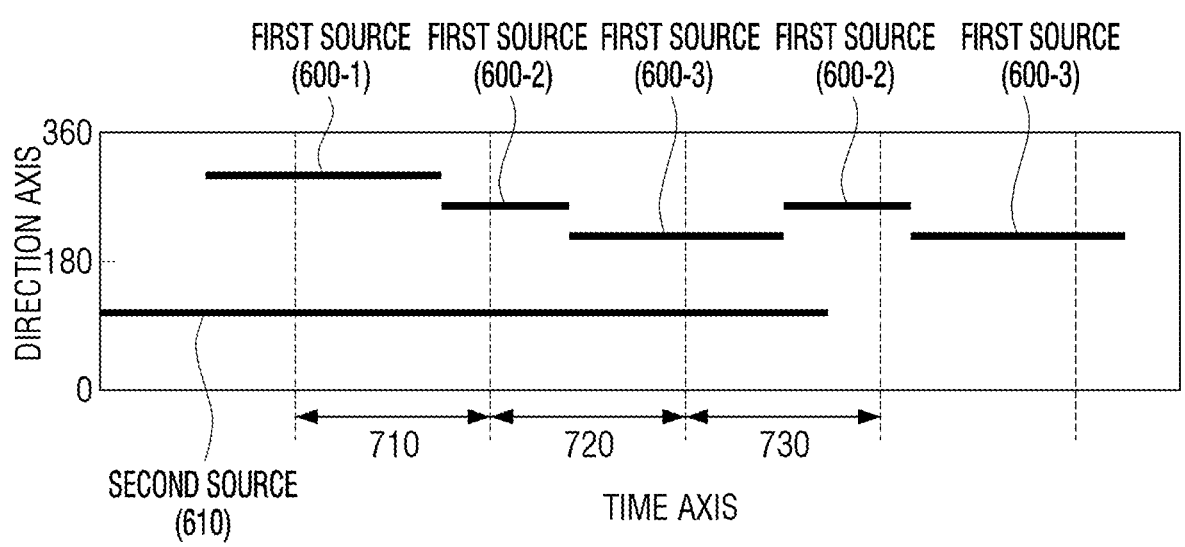

FIG. 6 and FIG. 7 are diagrams illustrating a process wherein an electronic device determines a target source in case the direction of an audio signal input into the electronic device is changed.

Referring to FIG. 6, the electronic device 100 may receive input of a plurality of audio signals output by the first source 600 of which location is changed and the second source 610 in a fixed location. For example, the first source 600 may output audio signals while changing its locations to the first location 600-1, the second location 600-2, and the third location 600-3. In case it is determined that the audio signals output by the first source 600 are input while their directions are changed, the electronic device 100 may determine the first source 600 as the target source.

Specifically, referring to FIG. 7, FIG. 7 is a graph illustrating a process wherein the electronic device 100 receives input of audio signals from the first source 600 and the second source 610. The x axis in FIG. 7 is regarding the time that passes while audio signals are input, and the y axis is regarding the directions in which the audio signals are input.

The electronic device 100 may determine whether the input directions of the plurality of audio signals have been changed during a predetermined time T. That is, the electronic device 100 may determine that the directions in which the plurality of audio signals output by the first source 600 and the second source 610 are input into the electronic device are changed during the predetermined period T (710, 720, 730).

For example, the electronic device 100 may determine that audio signals output by the first source 600 were changed from the direction of the first location 600-1 to the direction of the second location 600-2 while the first period 710 passed. In contrast, the electronic device 100 may determine that the direction of the second source 610 was not changed during the first period 710. In this case, the electronic device 100 may determine the first source 600 as the target source, and track the input directions of the audio signals output from the first source 600.

Likewise, while the second period 720 and the third period 730 are passing, the electronic device 100 may determine that the directions in which the audio signals output from the first source 600 are input into the electronic device are changed. In contrast, the electronic device 100 may determine that the input directions of the audio signals output by the second source 610 are maintained to be constant. In this case, the electronic device 100 may determine the first source 600 as the target source, and track the input directions of the audio signals output from the first source 600.

While it is illustrated that the directions of the audio signals output by the second source 610 are constant in FIG. 7, in actuality, even if the second source 610 is outputting audio in a fixed location, the audio signal may be input while its direction is changed slightly. In this case, if the difference between the starting input direction and the last inputting direction of the audio output by the second source 610 within a predetermined period (e.g., 710) does not exceed a predetermined size (i.e., a case wherein the difference is within a specific range), the electronic device 100 may determine the audio signal as an audio signal of which direction is not changed. The electronic device 100 may replace the direction of the second source 610 during a predetermined period (e.g., 710) as being input constantly in the starting input direction. However, this is merely an example, and the electronic device 100 may replace the direction of the second source 610 during a predetermined period (e.g., 710) as being input constantly as the average value of the starting input direction and the last input direction.

Figure 8:
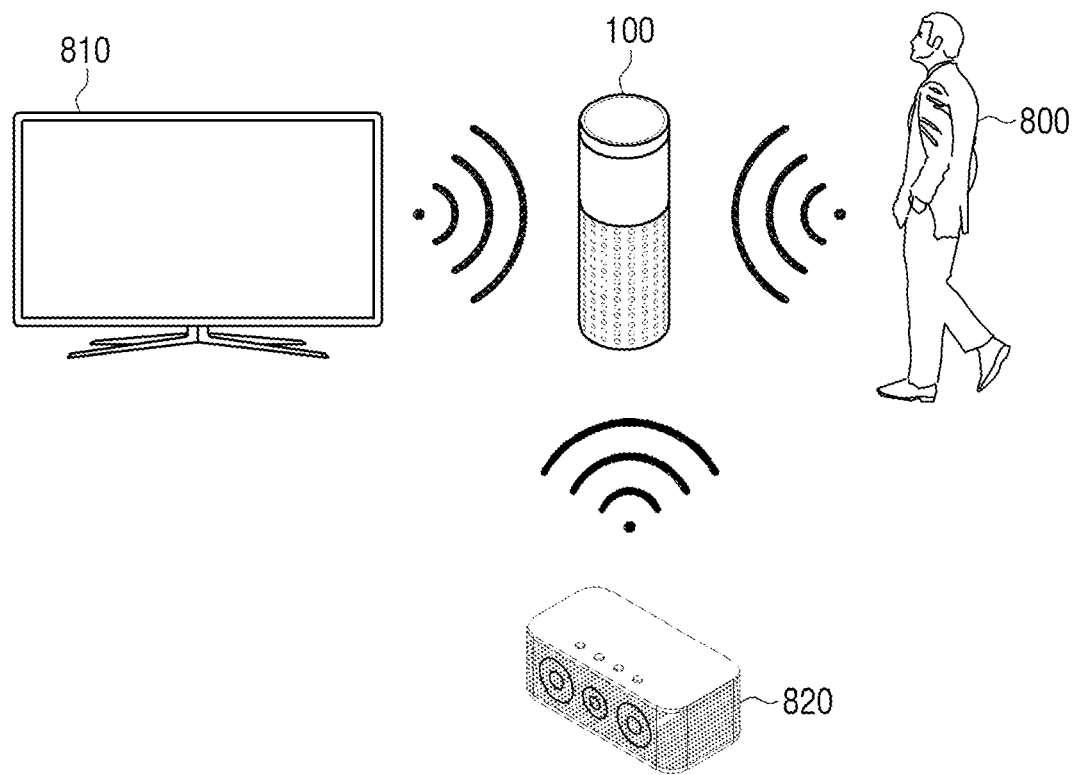
FIG. 8 and FIG. 9 are diagrams illustrating a process wherein an electronic device determines a target source in case input duration times of audio signals input into the electronic device are different according to an embodiment of the disclosure.
Figure 9:
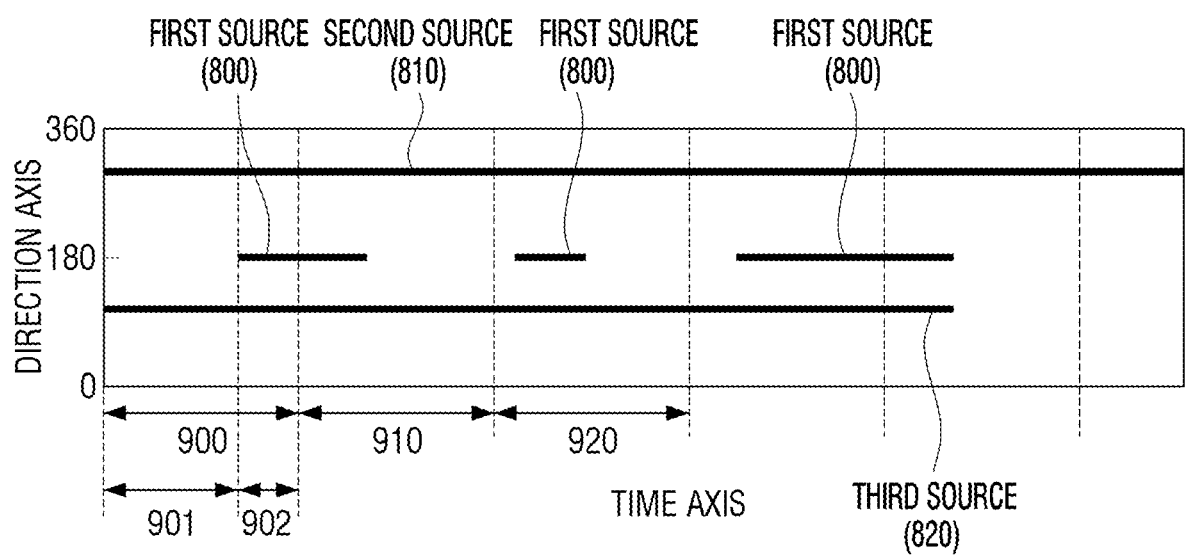

FIG. 8 and FIG. 9 are diagrams illustrating a process wherein an electronic device determines a target source in case input duration times of audio signals input into the electronic device are different.

Referring to FIG. 8, the electronic device 100 may receive input of a plurality of audio signals output by the first source 800, the second source 810, and the third source 830 of which locations are fixed. The electronic device 100 may determine that the duration time of the audio signal output by the first source 800 is shorter compared to the audio signals output by the second source 810 and the third source 820. Here, the electronic device 100 may determine the first source 800 outputting the audio signal input in the shortest input duration time among the plurality of audio signals as the target source.

Specifically, referring to FIG. 9, FIG. 9 is a graph illustrating a process wherein the electronic device 100 receives input of audio signals from the first source 800, the second source 810, and the third source 830. The x axis in FIG. 7 is regarding the time that passes while audio signals are input, and the y axis is regarding the directions in which the audio signals are input.

Referring to FIG. 9, the electronic device 100 may receive input of a plurality of audio signals output by the first source 800, the second source 810, and the third source 830. The electronic device 100 may receive input of continuous audio signals output by the second source 810 and the third source 820, and determine that the input duration time of the audio signal output by the first source 800 is relatively shorter.

In case audio signals are input continuously without being cut off while a predetermined period T (900, 910, 920) passes, the electronic device 100 may increase counters indicating continuity for the audio signals. Specifically, the electronic device 100 may determine that audio signals output by the second source 810 and the third source 820 are input without being cut off while the predetermine time 900 passes, and increase counters for each audio signal. If an audio signal output by the first source 800 is input during the predetermined period 910, the electronic device 100 may determine the first source 800 having a lower counter than the counters for the second source 810 and the third source 820 as the target source. The electronic device 100 may determine the first source 800 as the target source, and track the input direction of the audio output by the first source 800.

Meanwhile, in FIG. 9, a process of determining a target source for a plurality of audio signals output by three sources was described, but the electronic device 100 may perform a process of determining a target source for only the two audio signals having the biggest input signal sizes in the case of receiving a plurality of audio signals.

For example, the electronic device 100 may receive input of two audio signals output by the second source 810 and the third source 820 during the first period 901. Here, in the case of receiving input of an audio signal output by the first source 800 during the second period 902, the electronic device 100 may perform a process of determining a target source only for the two audio signals having relatively bigger input signal sizes among the three audio signals. For example, in case the size of the audio signal output by the first source 800 is bigger than the audio signal of the third source 820 and smaller than the audio signal of the second source 810, the electronic device 100 may perform a process of determining a target source only for the first source 800 and the second source 810 during the second period 902.

Each of FIG. 6 to FIG. 9 described a case of determining that the directions of audio signals input into the electronic device have been changed and a process of determining a target source according to the input duration times of the audio signals input into the electronic device. However, this is merely an example, and a process wherein the electronic device 100 determines a target source may vary.

For example, the electronic device 100 may determine that there are a plurality of audio signals of which directions were determined to be changed among a plurality of audio signals. In this case, the electronic device 100 may track only signals of which directions are changed for determination of the target source. Afterwards, the electronic device 100 may determine a source outputting an audio signal of which input duration time is short among the plurality of tracked audio signals as the target source.

Alternatively, the electronic device 100 may exclude audio signals input during a time period exceeding a predetermined input duration time without change of directions from a process of determining a target source. Specifically, the electronic device 100 may exclude audio signals that lasted exceeding a predetermined period (or a predetermined number of frames) among a plurality of audio signals, and track only audio signals input during a time period shorter than the predetermined period. Afterwards, the electronic device 100 may determine a source outputting an audio signal of which direction is changed among the plurality of tracked audio signals as the target source. Through such an embodiment, the electronic device 100 may effectively remove a source outputting continuous noises without change of the direction, and thereby prevent unnecessary waste of operations.

Figure 10:
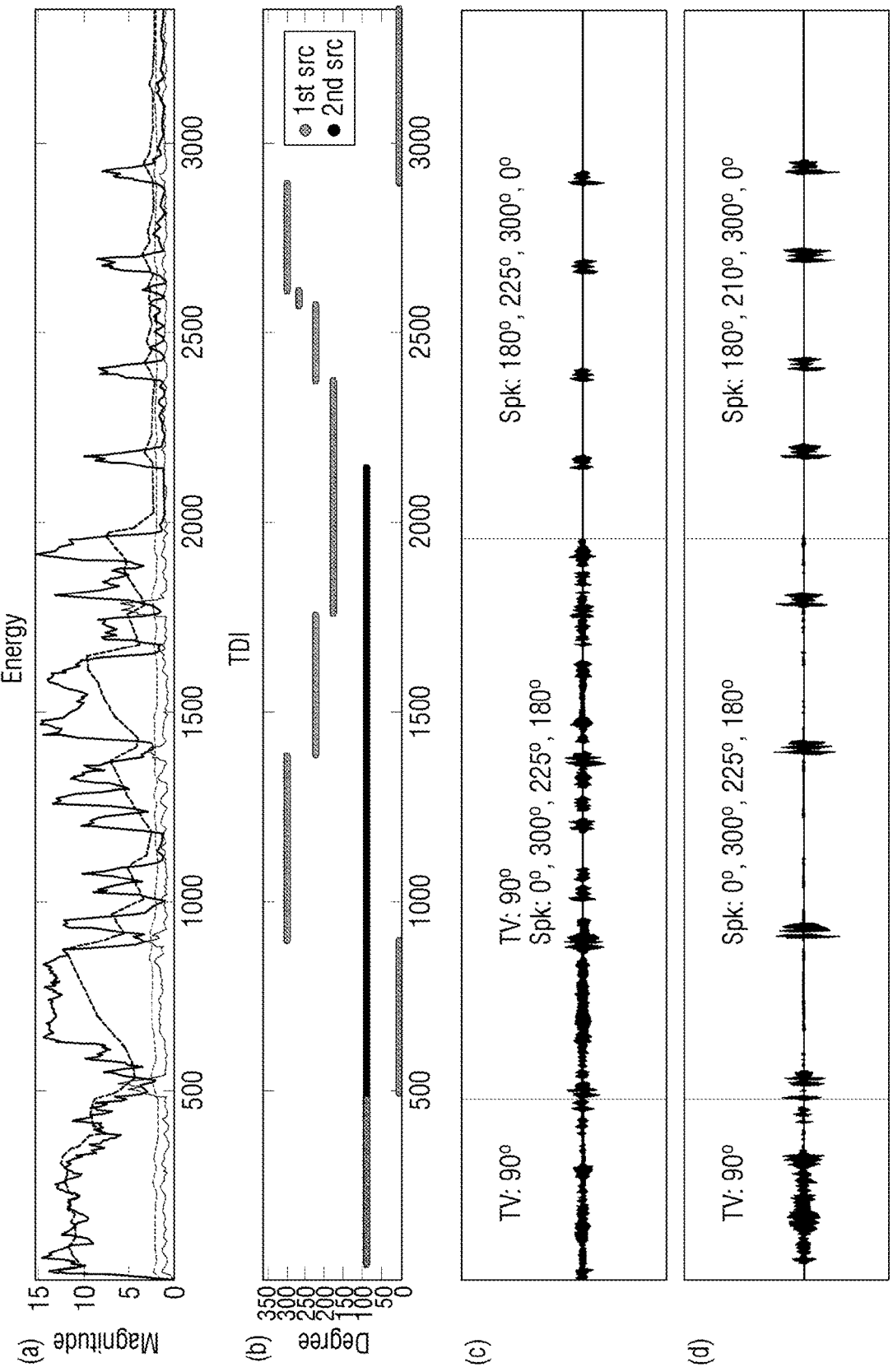
FIG. 10 is a diagram illustrating tracking and separation of a plurality of audio signals by applying a method of selecting the direction of a target source according to an embodiment of the disclosure.

FIG. 10 is a diagram illustrating tracking and separation of a plurality of audio signals by applying a method of selecting the direction of a target source of the disclosure. FIG. 10(A) is a diagram illustrating beam forming energy for each angle of a plurality of audio signals tracked at the sound source direction tracking part 300. FIG. 10(B) is a diagram illustrating selection of the direction of a target source by the target direction selection part 310 of the disclosure. FIG. 10(C) is a diagram illustrating a plurality of audio signals for a mike corresponding to the direction in which the target source is located among the plurality of mikes constituting the mike array 110. FIG. 10(D) is a diagram illustrating recognition of the direction in which the target source is tracked among the plurality of audio signals received by the mike array 110 and only the separation result corresponding to the target source.

According to the method of selecting the direction of a target source of the disclosure, even in an environment wherein a plurality of audio signals are input from a plurality of sources as in FIG. 10, a target source, i.e., a user's speech can be tracked stably and separated. If the direction of a user's speech is tracked stably, there is an effect that a conventional speech preprocessing technology can extract a sound in the direction more correctly, and thereby improve a recognition performance of a speech in a far distance.

Figure 11:
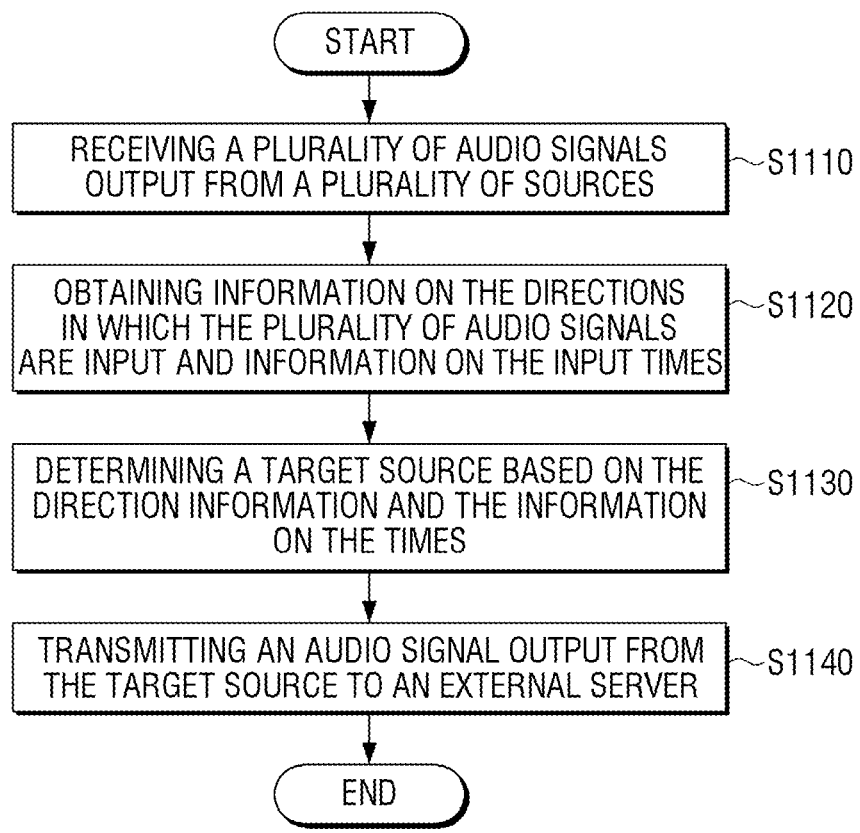
FIG. 11 is a block diagram for illustrating a process wherein an electronic device determines a signal for recognition among a plurality of audio signals according to an embodiment of the disclosure.

FIG. 11 is a block diagram for illustrating a process wherein an electronic device determines a signal for recognition among a plurality of audio signals according to an embodiment of the disclosure.

The electronic device 100 may receive a plurality of audio signals output from a plurality of sources at operation S1110. Afterwards, the electronic device 100 may obtain information on the directions in which the plurality of audio signals are input and information on the times when the audio signals are input at operation S1120. The electronic device 100 may track the respective directions in which the plurality of audio signals are input based on the acquired information. Based on the obtained information on the input directions of the audio signals and information on the input times of the audio signals, the electronic device 100 may determine the audio signal output by the target source among the plurality of audio signals at operation S1130. Specifically, the electronic device 100 may determine an audio signal of which input direction is changed or an audio signal of which input duration time is short among the plurality of audio signals as the audio signal output by the target source. The electronic device 100 may track the direction of the audio signal input from the determined target source, and transmit the audio signal output by the target source to an external server for speech recognition at operation S1140.

Also, while preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A control method of an electronic device, the control method comprising:
   receiving a plurality of audio signals output from a plurality of sources through a plurality of microphones;
   analyzing the plurality of audio signals and obtaining information on directions in which the plurality of audio signals is received and information on input times of the plurality of audio signals;
   determining signal sizes and input duration times of the plurality of audio signals based on the information on input times of the plurality of audio signals;
   identifying at least one audio signal having a signal size exceeding a predetermined signal size and having an input duration time exceeding a predetermined time among the plurality of audio signals;
   determining whether each of the directions in which the plurality of audio signals are input, has been changed more than a predetermined angle among the identified at least one audio signal;
   determining at least one source outputting an audio signal of which the determined direction in which the audio signal is input has been changed more than the predetermined angle;
   determining a source outputting an audio signal having shortest input duration time among the at least one source as a target source; and
   processing an audio signal obtained from the determined target source,
   wherein the method further comprising:
      based on at least one audio signal being input continuously for a preset time, increasing counter of the at least one audio signal, the counter representing continuity of the at least one audio signal,
      determining a source outputting an audio signal of which counter is lowest among the plurality of the audio signals as the source outputting the audio signal having the shortest input duration time.

2. The control method of the electronic device of claim 1, wherein the determining of whether each of the directions in which the audio signals are input has been changed further comprises:

determining an angle at which each of the directions in which the audio signals are input, is changed during a predetermined time period; and based on the determined angle of change being within the predetermined angle, determining whether each of the directions in which the audio signals are input is same during the predetermined time period.

3. The control method of the electronic device of claim 1, wherein the determining of sizes and input duration times of audio signals comprises:

based on the determined signal sizes being input as signal sizes smaller than the predetermined signal size exceeding a predetermined time period, initializing the input duration times of the audio signals.

4. The control method of the electronic device of claim 1, comprising:

based on two or more audio signals having signal size exceeding the predetermined signal size and having input duration time exceeding the predetermined time being identified among the plurality of audio signals, determining the target source for speech recognition based on the information on directions and the information on input times for two audio signals having biggest signal sizes among the identified at least one audio signal.

5. The control method of the electronic device of claim 1, comprising:

based on the identifying at least one audio signal exceeding the predetermined signal size and the predetermined time among the plurality of audio signals, determining a source outputting the identified at least one audio signal as the target source.

6. The control method of the electronic device of claim 1, wherein the processing comprises:

transmitting information corresponding to an audio signal obtained from the determined target source to an external server.

7. An electronic device comprising:
a plurality of microphones; and
a processor configured to:
analyze a plurality of audio signals output from a plurality of sources received through the plurality of microphones and obtain information on directions in which the plurality of audio signals is received and information on input times of the plurality of audio signals;

determine signal sizes and input duration times of the plurality of audio signals based on the information on the input times of the plurality of audio signals;

identify at least one audio signal having a signal size exceeding a predetermined size and having an input duration time exceeding a predetermined time;

determine whether each of the directions in which the plurality of audio signals is input, has been changed more than a predetermined angle among the identified at least one audio signal;

determine at least one source outputting an audio signal of which the determined direction in which the audio signal is input has been changed more than the predetermined angle;

determine a source outputting an audio signal having shortest input duration time among the at least one source as a target source for speech recognition; and process an audio signal obtained from the determined target source, wherein the processor is configured to:
based on at least one audio signal being input continuously for a preset time, increase counter of the at least one audio signal, the counter representing continuity of the at least one audio signal, determine a source outputting an audio signal of which counter is lowest among the plurality of the audio signals as the source outputting the audio signal having the shortest input duration time.

8. The electronic device of claim 7,
wherein the processor is configured to:
determine whether the directions in which the audio signals are input has been changed, determine an angle at which the directions in which the audio signals are input is changed during a predetermined time period, and based on the determined angle of change being within the predetermined angle, determine that the directions in which the audio signals are input are the same during the predetermined time period.

9. The electronic device of claim 7,
wherein the processor is configured to:
based on the determined signal sizes being input as signal sizes smaller than the predetermined signal size, exceeding a predetermined time period, initialize the input duration times of the audio signals.

* * * * *